(12) United States Patent
Gasperini et al.

(10) Patent No.: US 8,959,489 B2
(45) Date of Patent: Feb. 17, 2015

(54) ARBITRARY OBJECT EDITING (75) Inventors: Alan J. Gasperini, Kirkland, WA (US); James S. Nakashima, Kirkland, WA (US); Juraj Hlavac, Seattle, WA (US); Gary K. Linscott, Kirkland, WA (US); Charles P. Jazdzewski, Redmond, WA (US); Jeffrey W. Kelly, Redmond, WA (US); Unnikrishnan Ravindranathan, Redmond, WA (US); Brian K. Pepin, Seattle, WA (US); Mark A. Boulter, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1909 days.

(21) Appl. No.: 11/735,688

(22) Filed: Apr. 16, 2007

(65) Prior Publication Data
US 2008/0256465 A1 Oct. 16, 2008

(51) Int. Cl.
G06F 9/44 (2006.01)

(52) U.S. Cl.
CPC ........................................ G06F 8/24 (2013.01)
USPC ........... 717/128; 717/124; 717/127; 717/129; 709/219; 709/223; 707/100

(58) Field of Classification Search
USPC .......................................................... 715/762
See application file for complete search history.

(56) References Cited

U.S. PATENT DOCUMENTS

| | | | | |
|---|---|---|---|---|
| 5,842,020 | A | | 11/1998 | Faustini |
| 5,991,534 | A | * | 11/1999 | Hamilton et al. ............. 717/111 |
| 6,237,135 | B1 | | 5/2001 | Timbol |
| 6,336,137 | B1 | * | 1/2002 | Lee et al. ...................... 709/219 |
| 6,769,095 | B1 | | 7/2004 | Brassard et al. |
| 6,912,714 | B1 | * | 6/2005 | Cocks et al. ................... 719/310 |
| 7,020,532 | B2 | * | 3/2006 | Johnson et al. ................ 700/89 |
| 7,039,859 | B1 | | 5/2006 | Sundaresan |
| 7,076,766 | B2 | | 7/2006 | Wirts et al. |
| 7,272,819 | B2 | * | 9/2007 | Seto et al. ...................... 717/109 |
| 7,426,734 | B2 | * | 9/2008 | Debique et al. ............... 719/310 |
| 7,467,374 | B2 | * | 12/2008 | Nishanov et al. ............. 717/128 |

(Continued)

OTHER PUBLICATIONS

Tong Ho, "A scriptable xml editor with multiple css configurable views"; May 2005; Copyright 2005 Tong Ho http://www.geocities.com/tong_ho/cs297/docs/cs298report.pdf.
3.6. Editing an object's properties; Feb. 27, 2007 http://www.geom.uiuc.edu/software/crafter/docs/props.html.

(Continued)

Primary Examiner — Don Wong
Assistant Examiner — Deric Ortiz
(74) Attorney, Agent, or Firm — Kevin Sullivan; Kate Drakos; Micky Minhas (57) ABSTRACT

The present invention provides technologies for forming an editing interface for editing arbitrary objects. In particular, the present invention provides system and methods for enumerating object properties, selecting a suitable pre-existing object editor and, if no such pre-existing editor is available, constructing an object editor on the fly suitable for editing the properties of the object where the object may include properties and/or collections of objects. Construction of a suitable editor is based on enumeration of object properties and on the serialization of the object using a descriptive language such as extensible markup language ("XML") or the like. Property values specified by a user via the object interface and editors are stored in a descriptive format such as XML and generally specify the initial characteristics of the object.

16 Claims, 7 Drawing Sheets

(56) References Cited

U.S. PATENT DOCUMENTS

2004/0015858 A1* 1/2004 Seto et al. .................. 717/120
2006/0195783 A1  8/2006 Davis et al.

OTHER PUBLICATIONS

Integration Object Guide; last entered Apr. 11, 2007 http://www.xmlobjective.com/html/assets/ObjectEditorGuide.pdf.

* cited by examiner

ARBITRARY OBJECT EDITING

BACKGROUND

Object-oriented programming is common for developing software applications; the creation and use of reusable objects can simplify development. By combining visual programming environments with object oriented programming, development can be further simplified. But it can be difficult to provide for the editing of arbitrary objects in a development environment. Specific purpose editing tools may be created and built into an environment for known objects, but support for external or custom objects may be difficult to provide.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies for the editing of arbitrary objects in a development environment. In particular, the present examples provide systems and methods for enumerating the properties of a selected arbitrary object, selecting a suitable object editor and, if no such editor is available, constructing object editors on the fly for the properties of both individual objects and for collections of objects. Construction of a suitable editor is based on enumeration of object properties and on the serialization of an object using a descriptive language such as extensible markup language ("XML") or the like. Property values specified by a user via the object editor are stored in a descriptive format and generally specify the initialization characteristics of the object.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in development and computing environments, the environments described are provided as examples and not limitations. As those skilled in the art will appreciate, the present examples are suitable for application in a variety of different types of environments and systems.

Figure 1:
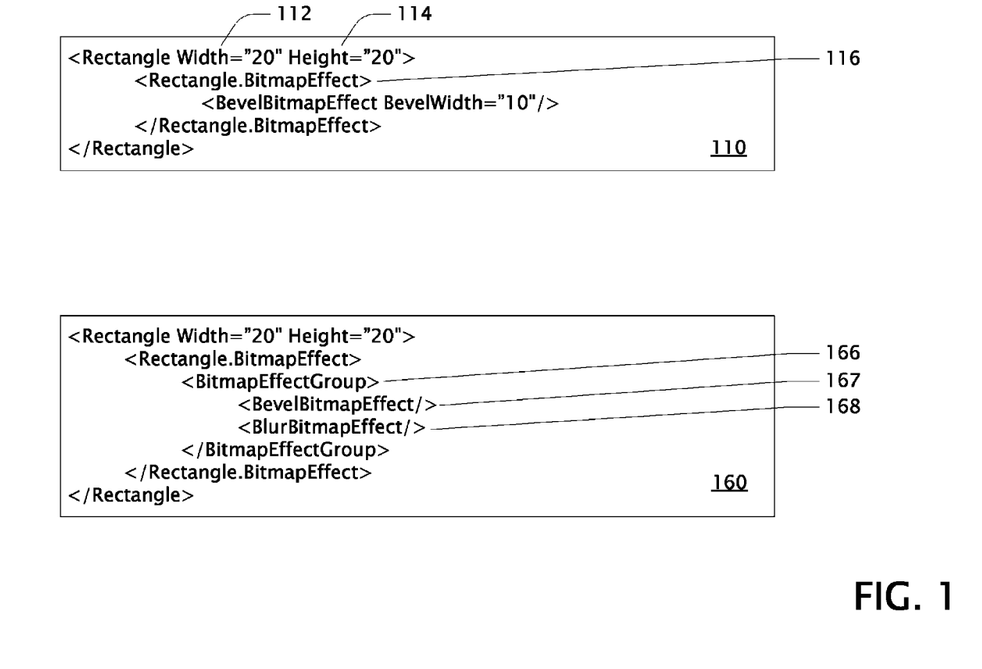
FIG. 1 is a diagram showing two sample object descriptions.

FIG. 1 is a diagram showing two sample object descriptions 110 and 160. Description 110 is an example of an XML description that defines a rectangle object. In this example, the rectangle object defined by XML 110 is serialized using extensible application markup language ("XAML"), an XLM-based method of serializing objects. Such a description may be edited using value editors, collection editors, and/or sub-property editors.

Example XML 110 defines a rectangle object with three properties: Width 112, Height 114, and BitmapEffect 116. Width 112 and Height 114 are both double precision floating point numbers that can be serialized as text. Since they can be serialized as text, a value editor can be used to edit properties 112 and 114 given that the value editor has the ability to convert a text string to a double precision floating point number ("double"), and can convert such a double back to a string. BitmapEffect property 116 is more complicated and uses XML element syntax to serialize itself. The bitmap effect set on the rectangle object is an instantiation of a BevelBitmapEffect class that has a BevelWidth property set to the value of 10, as shown in XML 110. Since there is no direct serialization of the BevelBitmapEffect to text, a property editing system cannot generally use a simple text editor to display and edit the BitmapEffect property 116. An arbitrary object editing ("AOE") system that does not include a value editor for a specific property, such as BitmapEffect 116, may use a sub-property editor for editing the property.

Many objects include properties that are a collection of objects. An example of this is shown in XML description 160, which is an XML definition of a rectangle with a different BitmapEffect than that included in 110. The value of the property BitmapEffectGroup 166 is a class that aggregates a collection of bitmap effects and applies them sequentially. XAML uses XML element syntax to denote child elements for representing elements in a collection. The BitmapEffectGroup class 166 exposes a Children property, but it is not shown in definition 160 because XAML allows classes to specify a content property, which will be used as the implicit property for any XML elements which are added as children. In this case, the BevelBitmapEffect 167 and the BlurBitmapEffect 168 properties are added to BitmapEffectGroup.Children, because Children is the content property for BitmapEffectGroup 166. An AOE system that does not include a value editor for a specific property, such as BevelBitmapEffect 167 and BlurBitmapEffect 168, may use a sub-property editor for editing the property.

Consider an object that can be completely described by a set of properties. Given two objects, they can be considered equivalent if their properties are equivalent. The properties have values, which can themselves be objects. There are generally two types of objects: primitives, such as a string, integer, or floating point number, which have no properties, and composites, which have a collection of properties that are themselves objects. The numeric types may be edited using a text box that includes number parsing. The string types may be edited using a simple text box. Booleans may be edited using one or more checkboxes, and enumerations may be edited using a choice editor that allows the user to choose from a set of pre-defined values.

For other types of objects, an AOE system can check for a value editor for that type. Such an editor can either be built into the editing system, or can be provided by the author of the object type if the type is defined external to the system. Consider the following non-primitive color class definition in C# (c-sharp) for which the example editor in FIG. 2 has been constructed.

Figure 2:
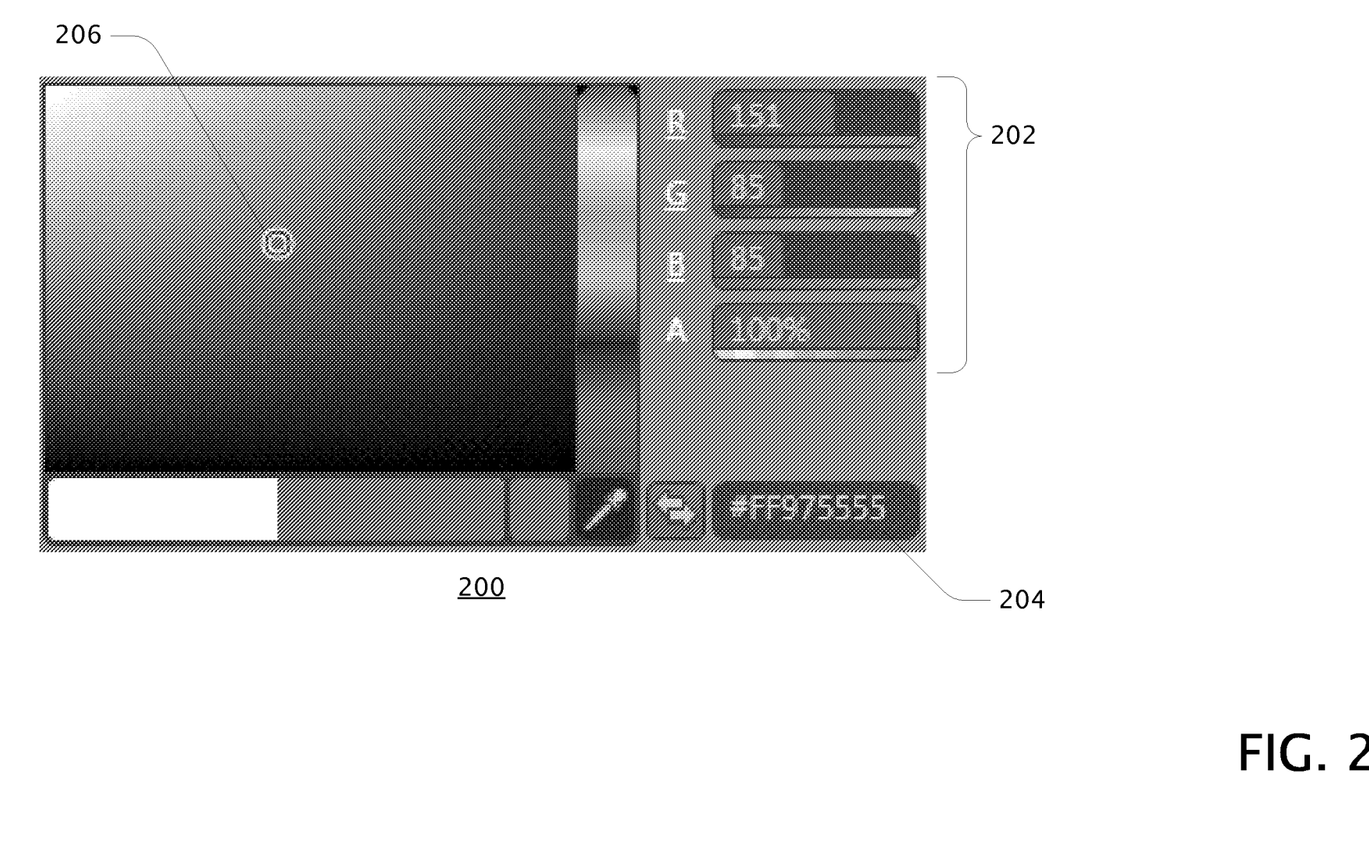
FIG. 2 is a diagram showing an example custom color editor.

```
public struct Color
{
    public byte A (get; set;)
    public byte R (get; set;)
    public byte G (get; set;)
    public byte B (get; set;)
}
```

FIG. 2 is a diagram showing an example custom color editor 200. Example editor 200 has several modes of operation: it can set individual color properties through the R, G, B, and A color channel editors 202, it can set the entire color at once using the hex editor 204, and it can set the hue, saturation, and lightness with a picker 206. Thus, even though color is not a primitive, it can be edited with a single editor 200.

If an object has a property with a type for which an AOE system includes an editor, the system may use the included editor for editing the property. If the system does not have an editor for the property, it can use a generic sub-property editor which typically enumerates all properties and constructs editors for each of the properties. In one example, an AOE system searches metadata such as that included in object files or the like for information defining the object and its properties. Such information may be used for serializing the object and constructing sub-property editors. Further, one or more custom object editors may be included in the metadata. Such custom editors may be discovered in the metadata and used by an AOE system for editing the object.

Figure 3:
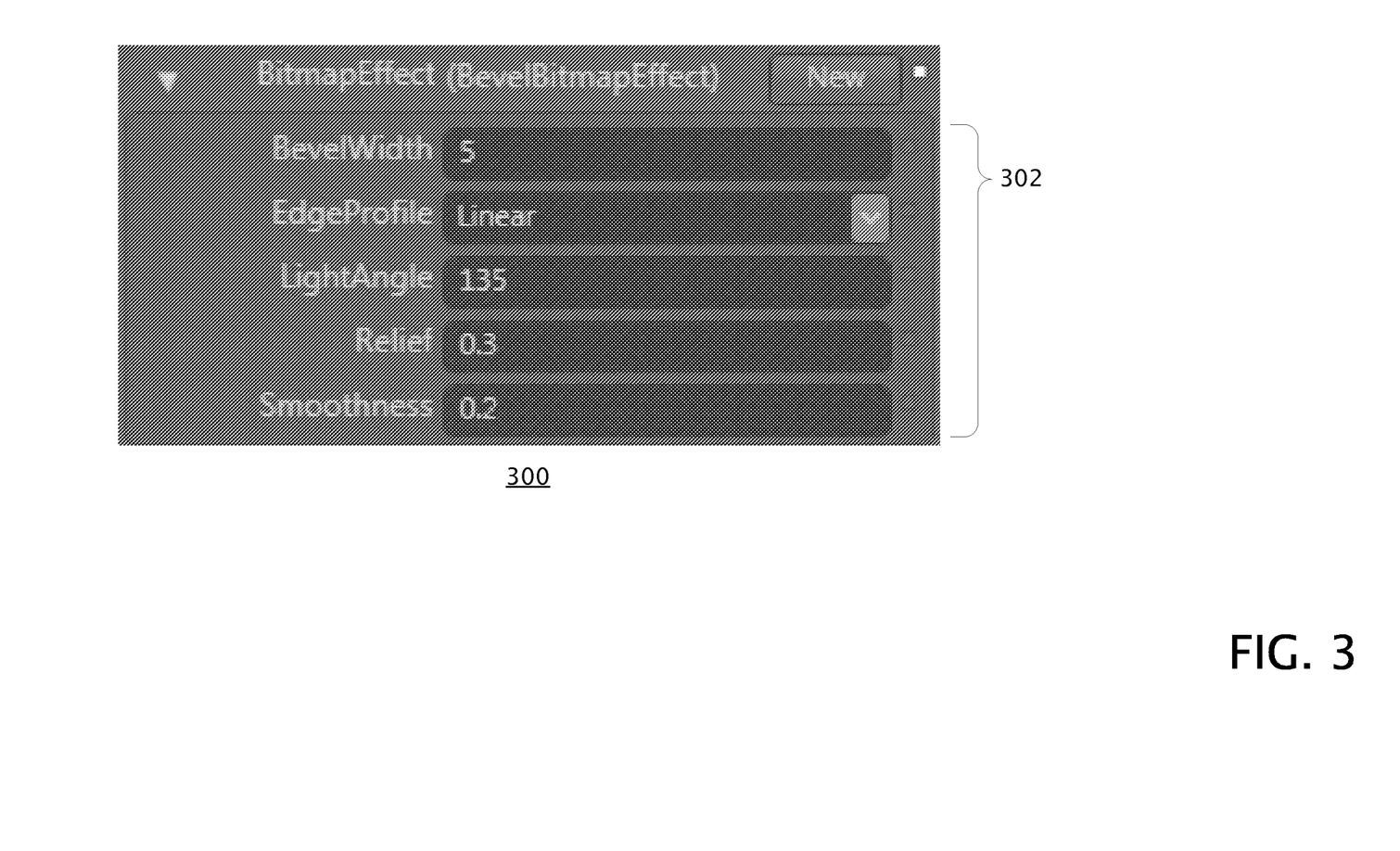
FIG. 3 is a diagram showing an example constructed object editor including edit fields for the object properties.

FIG. 3 is a diagram showing an example constructed object editor 300 including edit fields 302 for the object properties. Consider the following non-primitive BevelBitmapEffect class definition in C# for which the example editor in FIG. 3 has been constructed.

```
public sealed class BevelBitmapEffect
{
    public double BevelWidth (get; set;)
    public EdgeProfile EdgeProfile (get; set;)
    public double LightAngle (get; set;)
    public double Relief (get; set;)
    public double Smoothness (get; set;)
}
```

An AOE system not including a pre-defined editor for a BevelBitmapEffect object can take advantage of object metadata to construct sub-property editors for the properties of the BevelBitmapEffect class. Such an editor 300 is shown is FIG. 3 as an example. Such an editor may be constructed by reading object metadata of interest and forming sub-property editors, such as editors 302, for the object properties. Other user interface layouts, structures, and/or mechanisms may alternatively or additionally be used to construct an editor. The construction of such an editor is typically suitable for most objects, except those including collections of objects.

Figure 4:
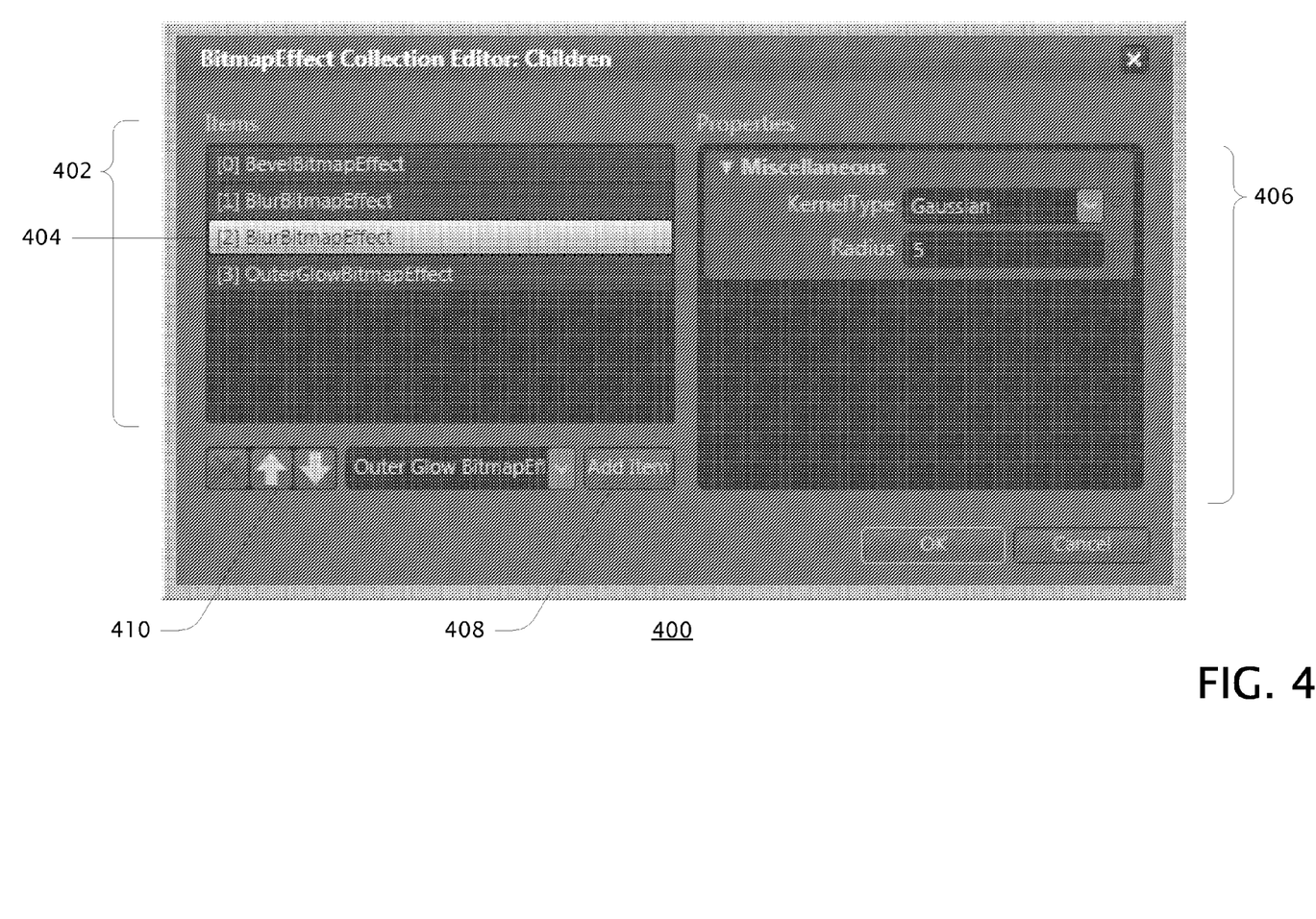
FIG. 4 is a diagram showing an example constructed collection editor including a list of items in the collection and edit fields for the selected item's properties.

FIG. 4 is a diagram showing an example constructed collection editor 400 including a list of items 402 in the collection and edit fields 406 for the selected item's 404 properties. Consider the following BitmapEffectGroup class:

```
public class BitmapEffectGroup
{
    public BitmapEffectCollection Children (get; set;)
}
```

A collection class such as BitmapEffectGroup typically aggregates a set of items. However, these items are generally not exposed through properties as seen in previous examples herein. To edit the items in a collection, there typically must be a way to access an editor or editors for each item in the collection. An AOE system may construct a collection editor for the editing of properties of collection items, such as collection editor 400 as shown in FIG. 4.

The construction and use of a collection editor allows a user to inspect and edit items in a collection, and to edit the properties of the items. Such a collection editor may also be constructed to allow adding and removing items from an item list, as well as reordering items in the collection. Object metadata may be used in the construction of the collection editor.

In one example, collection editor 400 is constructed to include an Item pane 402 listing items of interest. Listed items may be reordered or removed using button collection 410. Any items of the collection not listed may be added to Item pane 402 using control 408. For a selected item, such as example selected item 404, a Properties pane 406 provides an editor for the item including a listing of properties with an edit field for each. Once a user edits a collection, the collection is typically serialized using XML child element syntax. Other user interface layouts, structures, and/or mechanisms may alternatively or additionally be used to construct a collection editor.

Figure 5:
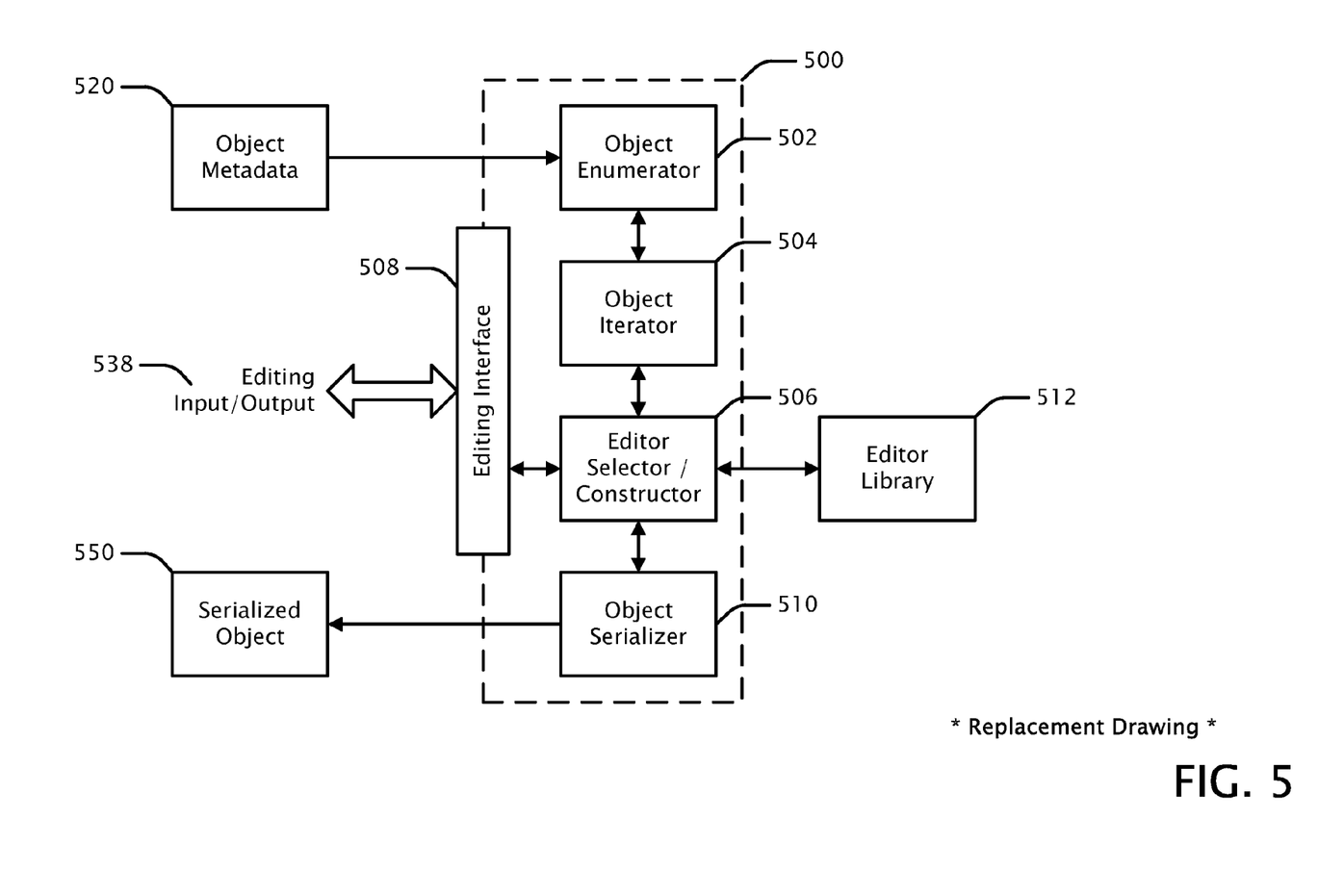
FIG. 5 is a block diagram showing an example arbitrary object editing system.

FIG. 5 is a block diagram showing an example arbitrary object editing system 500. Such a system may be used to select or construct suitable editors for editing arbitrary objects and their properties. With a combination of custom property editors, value editors, sub-property editors, collection editors, and the like, such as described herein, a user can edit any arbitrary object that can be serialized to XML or the like. Such a user may be a person and/or a system, application, device, or the like. The arrows shown in FIG. 5 associated with system 500 illustrate example interactions and couplings between system 500 and related elements and are not intended to be limiting or represent the only interactions and couplings.

Object enumerator 502 typically searches object metadata 520 for the definition of an object, enumerating its properties. In one example, object metadata 520 is stored in source files, object files, and/or binary files or the like, and is typically external to system 500. In alternate examples, object metadata may be integral, at least in part, to system 500.

Object iterator 504 typically iterates through at least a portion of the object properties enumerated by object enumerator 502, processing each such property. Processing for each property typically includes selecting or constructing a suitable editor. The portion or subset of properties processed may be determined by the system 500, by a user of the system, an author of the object, a method of using the object, an application in which the object is to be used, and/or any combination of the foregoing or the like.

Editor selector/constructor 506 typically determines, for each iterated property, if a pre-defined and/or custom editor is available or not. Such editors may be stored in a library or the like, such as editor library 512. Library 512 may be a separate resource utilized by system 500, may be an integral part of system 500, and/or may represent multiple such editor libraries. In one example, editor library 512 includes pre-defined editors and makes them available to system 500. Editor selector/constructor typically determines if a pre-defined editor is available to system 500 that is suitable for editing the iterated property. If a pre-defined editor is available, system 500 selects the editor. When no suitable editor is available for an iterated property from library 512 or the like, then editor selector/constructor 506 typically utilizes enumeration information to construct a suitable editor. For example, if the iterated property is a collection object, a collection editor is typically constructed. The selected or constructed editor is typically added to editing interface 508 which supports user input and output of property values. The selection and construction functionalities of editor selector/constructor 506 may be combined in a single element as shown in FIG. 5, or may be distributed among two or more distinct elements of system 500.

Editing interface 508 typically provides for the editing of property values. A user may input 538 a new property value, change an existing property value, or determine a property value. Such a user may be a person and/or a system, application, device, or the like. Editing interface 508 may be a user interface and/or an application programming interface ("API") or the like.

Object serializer 510 typically serializes an object 550 resulting in a description of the object including its iterated properties. In one example, serialization is performed using extensible application markup language ("XAML") and results in an extensible markup language ("XML") description of the object. Such a description may be used as the initial description of the object by an application using the object. Such a description may also include the edited property values of the object. In alternate examples, other descriptive formats may be used.

Figure 6:
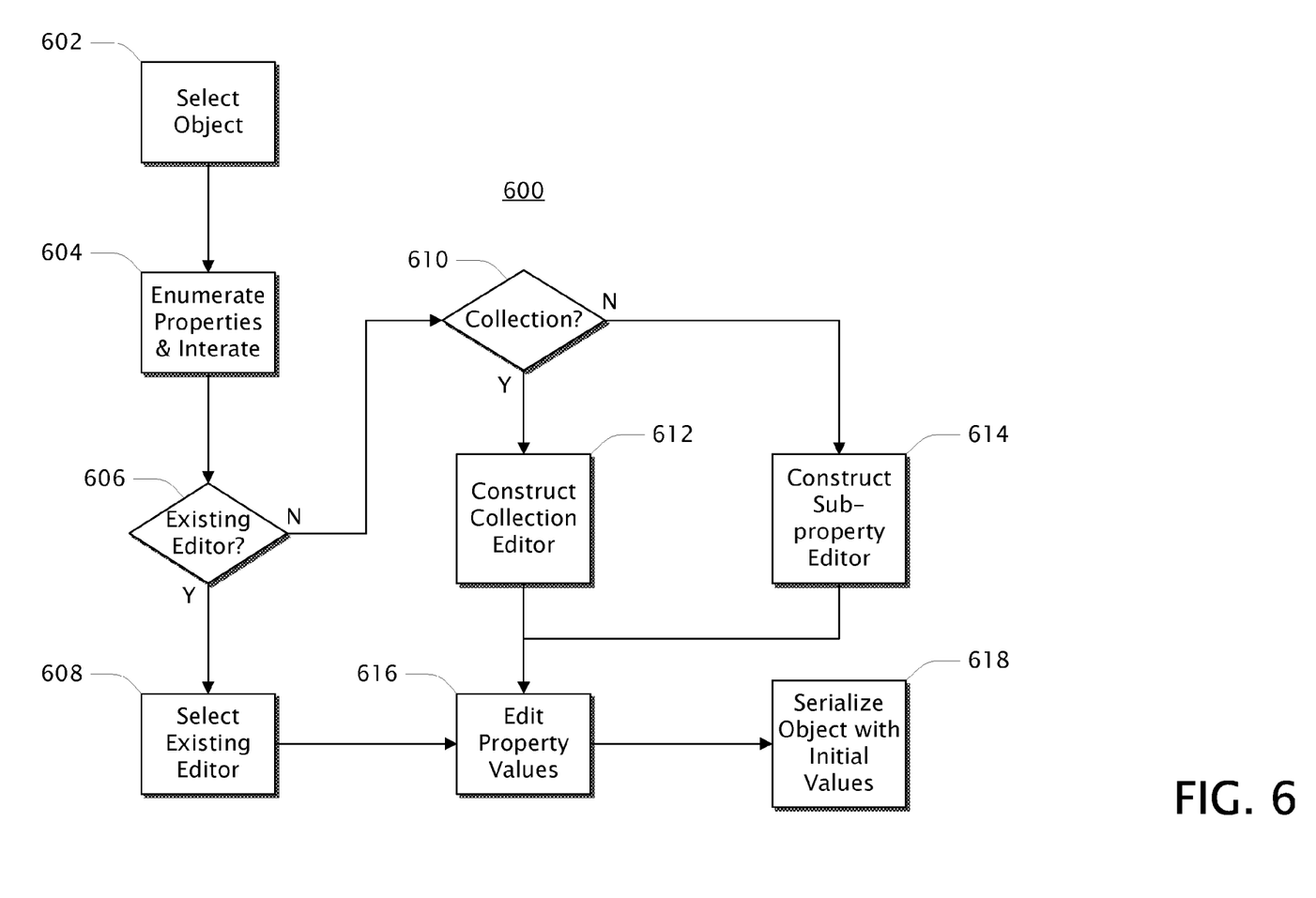
FIG. 6 is a block diagram showing an example method for enumerating object properties, selecting and/or constructing editors for object properties, and serializing the edited object.

FIG. 6 is a block diagram showing an example method 600 for enumerating object properties, selecting and/or constructing editors for object properties, and serializing the edited object.

Block 602 indicates selecting an object. In one example, a user selects an object via a visual programming environment. Alternatively, one or more objects may be selected using any suitable means, the selection being performed by a user, such as a person using via some user interface, or by a system, such as an application or device via some application programming interface ("API") and/or hardware interface or the like. Once an object is selected, method 600 typically continues at block 604.

Block 604 indicates enumerating the properties of the selected object and iterating through at least a portion of the properties for the purpose of selecting and/or constructing editors for the properties. In one example, an AOE system searches object metadata, such as that in object files and/or binary files, to enumerate object properties. The AOE system further selects an initial set of properties of interest from the enumerated properties, typically a subset of the enumerated properties, and iterates through those properties for the remaining steps of method 600. Once the selected object properties have been enumerated and iteration has begun, method 600 typically continues at block 606 for each iterated property.

Block 606 indicates determining if an editor exists for an iterated property. Such an editor may be any editor pre-defined and known to the AOE system. For example, in an AOE system including a custom color editor, if the iterated property is a color property for which the custom color editor is suitable for editing, then the AOE system determines that a suitable editor exists. If it is determined that a suitable editor exists, method 600 typically continues at block 608. Otherwise method 600 typically continues at block 610.

Block 608 indicates selecting the suitable existing editor determined at block 606. In one example, selecting the editor includes adding it to an object editing interface, such as a user interface. Once the editor is selected for the iterated property, method 600 typically continues at block 616.

Block 610 indicates determining if an iterated property is a collection, such as described in connection with FIG. 4. If the property is a collection, method 600 typically continues at block 612. Otherwise, method 600 typically continues at block 614.

Block 612 indicates constructing a collection editor suitable for editing the collection determined at block 610. In one example, a collection editor may be constructed such as editor 400 described in connection with FIG. 4. Once constructed, the editor may be added to an object editing interface, such as a user interface. Once the editor is constructed for the iterated property, method 600 typically continues at block 616.

Block 614 indicates constructing a sub-property editor suitable for editing the property determined at block 610. In one example, a sub-property editor may be constructed such as one of the property edit fields 302 of object editor 300 described in connection with FIG. 3. Once constructed, the sub-property editor may be added to an object editing interface, such as a user interface. Once the editor is constructed for the iterated property, method 600 typically continues at block 616.

Block 616 indicates editing property values using the selected and constructed editors once editors have been selected and/or constructed for all iterated properties. Editing is typically performed via an interface including the selected and/or constructed editors. Such an interface may be a user interface and/or an API and the editing may be performed by a user, such as a person, and/or a system, application, device, or the like. Once the editing is complete, method 600 typically continues at block 618.

Block 618 indicates serializing the edited object to XML or the like. In one example, serialization involves the use of XAML. The XML description of the object typically includes the property values as edited at block 616. Such an XML description typically provides initial property values for the object. Once the object is serialized, method 600 is typically complete.

Figure 7:
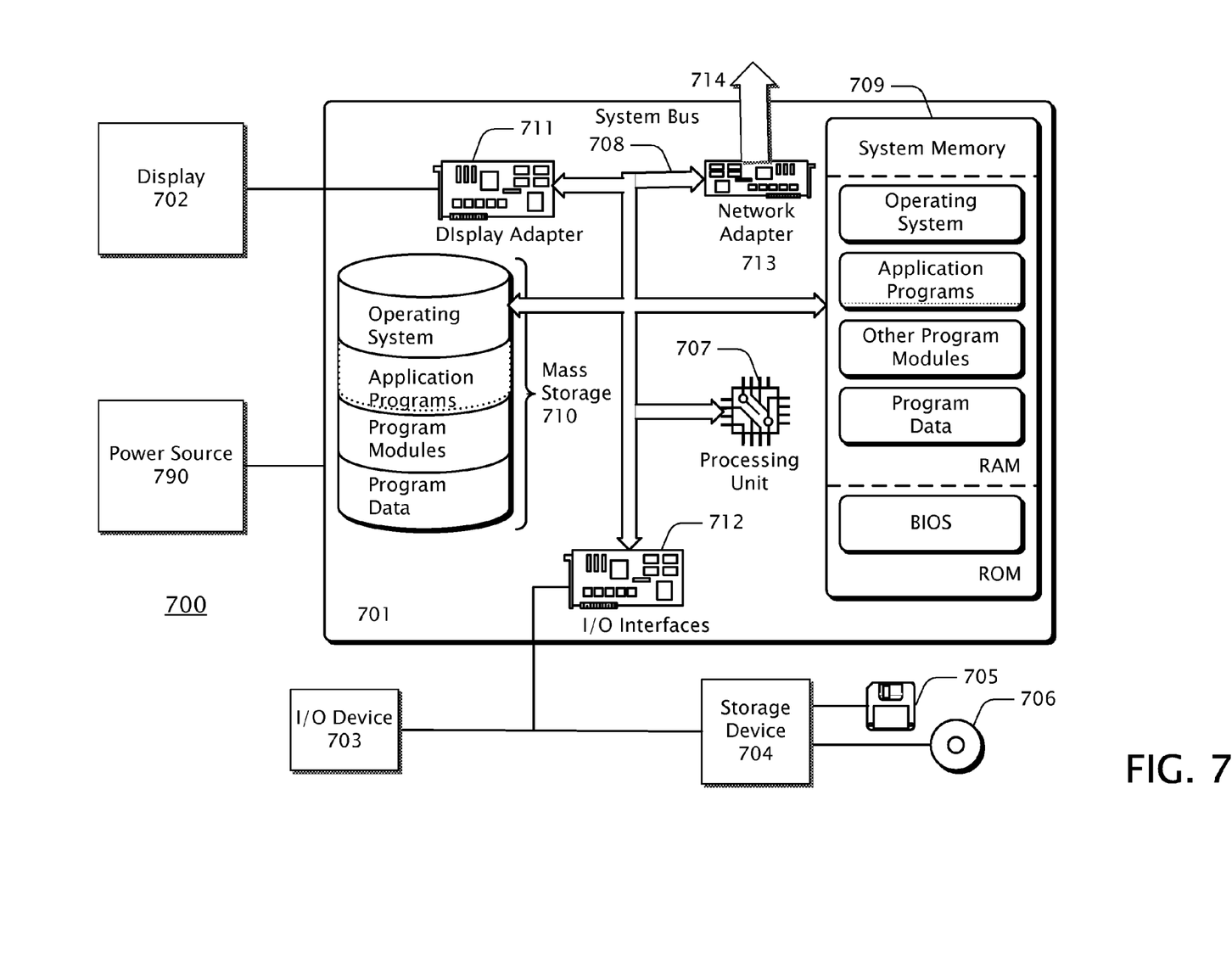
FIG. 7 is a block diagram showing an example computing environment in which at least portions of the technologies, systems, and/or methods described herein may be implemented.

FIG. 7 is a block diagram showing an example computing environment 700 in which at least portions of the technologies, systems, and/or methods described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 700 typically includes a general-purpose computing system in the form of a computing device 701 coupled to various components, such as peripheral devices 702, 703, 704 and the like. System 700 may couple to various other components, such as input devices 703, including voice recognition, touch pads, buttons, keyboards and/or pointing devices, such as a mouse or trackball, via one or more input/output ("I/O") interfaces 712. The components of computing device 701 may include one or more processors (including central processing units ("CPU"), graphics processing units ("GPU"), microprocessors ("µP"), and the like) 707, system memory 709, and a system bus 708 that typically couples the various components. Processor 707 typically processes or executes various computer-executable instructions to control the operation of computing device 701 and to communicate with other electronic and/or computing devices, systems or environment (not shown) via various communications connections such as a network connection 714 or the like. System bus 708 represents any number of several types of bus structures, including a memory bus or memory controller, a peripheral bus, a serial bus, an accelerated graphics port, a processor or local bus using any of a variety of bus architectures, and the like.

System memory 709 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 709 typically stores data, computer-executable instructions and/or program modules comprising computer-executable instructions that are immediately accessible to and/or presently operated on by one or more of the processors 707.

Mass storage devices 704 and 710 may be coupled to computing device 701 or incorporated into computing device 701 via coupling to the system bus. Such mass storage devices 704 and 710 may include non-volatile RAM, a magnetic disk drive which reads from and/or writes to a removable, non-volatile magnetic disk (e.g., a "floppy disk") 705, and/or an optical disk drive that reads from and/or writes to a non-volatile optical disk such as a CD ROM, DVD ROM 706. Alternatively, a mass storage device, such as hard disk 710, may include non-removable storage medium. Other mass storage devices may include memory cards, memory sticks, tape storage devices, and the like.

Any number of computer programs, files, data structures, and the like may be stored in mass storage 710, other storage devices 704, 705, 706 and system memory 709 (typically limited by available space) including, by way of example and not limitation, operating systems, application programs, data files, directory structures, computer-executable instructions, and the like.

Output components or devices, such as display device 702, may be coupled to computing device 701, typically via an interface such as a display adapter 711. Output device 702 may be a liquid crystal display ("LCD"). Other example output devices may include printers, audio outputs, voice outputs, cathode ray tube ("CRT") displays, tactile devices or other sensory output mechanisms, or the like. Output devices may enable computing device 701 to interact with human operators or other machines, systems, computing environments, or the like. A user may interface with computing environment 700 via any number of different I/O devices 703 such as a touch pad, buttons, keyboard, mouse, joystick, game pad, data port, and the like. These and other I/O devices may be coupled to processor 707 via I/O interfaces 712 which may be coupled to system bus 708, and/or may be coupled by other interfaces and bus structures, such as a parallel port, game port, universal serial bus ("USB"), fire wire, infrared ("IR") port, and the like.

Computing device 701 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 701 may be coupled to a network via network adapter 713 or the like, or, alternatively, via a modem, digital subscriber line ("DSL") link, integrated services digital network ("ISDN") link, Internet link, wireless link, or the like.

Communications connection 714, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 790, such as a battery or a power supply, typically provides power for portions or all of computing environment 700. In the case of the computing environment 700 being a mobile device or portable device or the like, power source 790 may be a battery. Alternatively, in the case computing environment 700 is a desktop computer or server or the like, power source 790 may be a power supply designed to connect to an alternating current ("AC") source, such as via a wall outlet.

Some mobile devices may not include many of the components described in connection with FIG. 7. For example, an electronic badge may be comprised of a coil of wire along with a simple processing unit 707 or the like, the coil configured to act as power source 790 when in proximity to a card reader device or the like. Such a coil may also be configure to act as an antenna coupled to the processing unit 707 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 702, I/O device 703, or many of the other components described in connection with FIG. 7. Other mobile devices that may not include many of the components described in connection with FIG. 7, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions.

Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device, the method for editing an object, the method comprising:
    enumerating object properties of the object, the enumerating based on object metadata that defines the object;
    iterating through at least a portion of the enumerated object properties of the object, the iterating including constructing, based on the serialization and in response to a pre-existing editor not being available for one of the iterated properties of the object, a collection editor that is configured for editing the one of the iterated properties of the object, where the constructing comprises determining if one of the at least a portion of the enumerated object properties is part of a collection; and
    serializing, in response to the editing the one of the iterated properties of the object via the constructed collection editor, the object according to the markup language.

2. The method of claim 1 further comprising determining if the pre-existing editor is suitable for editing one of the at least a portion of the enumerated object properties.

3. The method of claim 1 where the constructing a collection editor includes constructing a sub-property editor configured for editing a property of the one of the at least a portion of the enumerated object properties.

4. The method of claim 1 where the serializing results in an extensible markup language ("XML") description of the object.

5. The method of claim 1 where the serializing utilizes extensible application markup language ("XAML").

6. The method of claim 1 where the serialized object includes property values established during editing.

7. The method of claim 1 further comprising forming an interface including a plurality of editors including the selected existing editor or the constructed editor.

8. The method of claim 1 where an object file or a binary file includes at least a portion of the object metadata.

9. The method of claim 1 embodied as computer-executable instructions stored on a computer-readable medium.

10. A system comprising a computing device and at least one software module together configured for performing actions comprising:
    enumerating object properties of an object, the enumerating based on object metadata that defines the object, where a serialization of the object is based on a markup language;
    iterating through at least a portion of the enumerated object properties of the object, the iterating including constructing, based on the serialization and in response to a pre-existing editor not being available for one of the iterated properties of the object, a collection editor that is configured for editing the one of the iterated properties of the object, where the constructing comprises determining if one of the at least a portion of the enumerated object properties is part of a collection; and
    serializing, in response to the editing the one of the iterated properties of the object via the constructed collection editor, the object according to the markup language.

11. The system of claim 10 where the object metadata is stored in an object file or a binary file.

12. The system of claim 10, where the actions further comprise:
    adding the pre-existing editor to an editing interface if the pre-existing editor is configured for editing the one of the iterated properties of the object; and
    adding the constructed collection editor to the editing interface if the pre-existing editor is not configured for editing the one of the iterated properties of the object.

13. The system of claim 10, where the actions further comprise utilizing extensible application markup language ("XAML") to serialize the object including the one of the iterated properties of the object.

14. The system of claim 10, where the actions further comprise creating an extensible markup language ("XML") description of the object including the one of the iterated properties of the object.

15. A method performed on a computing device, the method for forming an editing interface for editing an object, the method comprising:
    enumerating object properties of the object, the enumerating based on object metadata that defines the object, and where a serialization of the object is based on a markup language;
    iterating through at least a portion of the enumerated object properties of the object, the iterating including processing each property of the at least a portion of the enumerated object properties of the object, the processing including:
        determining if a pre-existing editor is available that is configured for editing the each property and, if so, selecting the pre-existing editor, otherwise
        constructing, based on the serialization and in response to the pre-existing editor not being available, a collection editor configured for editing the each property, where the constructing comprises determining if one of the at least a portion of the enumerated object properties is a collection, and
        adding the selected pre-existing editor or the constructed collection editor to the editing interface, the editing interface including a plurality of editors; and serializing, according to the markup language, the object including the at least a portion of the enumerated object properties, the serializing in response to editing the one of the iterated properties of the object via the constructed collection editor.

16. The method of claim 15 embodied as computer-executable instructions stored on a computer-readable medium.

\* \* \* \* \*